(12) United States Patent
Hamada et al.

(10) Patent No.: US 12,377,474 B2
(45) Date of Patent: Aug. 5, 2025

(54) DRILL HEAD AND DRILL

(71) Applicant: Sumitomo Electric Hardmetal Corp., Itami (JP)

(72) Inventors: Ryusei Hamada, Itami (JP); Kouki Matsubara, Itami (JP); Kenta Nishi, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 479 days.

(21) Appl. No.: 17/801,265

(22) PCT Filed: Nov. 12, 2021

(86) PCT No.: PCT/JP2021/041746
§ 371 (c)(1),
(2) Date: Aug. 22, 2022

(87) PCT Pub. No.: WO2022/130856
PCT Pub. Date: Jun. 23, 2022

(65) Prior Publication Data
US 2023/0022961 A1  Jan. 26, 2023

(30) Foreign Application Priority Data

Dec. 16, 2020 (JP) .................................. 2020-208320

(51) Int. Cl.
*B23B 51/00* (2006.01)

(52) U.S. Cl.
CPC ................ *B23B 51/0007* (2022.01)

(58) Field of Classification Search
CPC ............ B23B 51/0004; B23B 51/0003; B23B 2251/02; B23B 2240/00; B23B 2200/165;
(Continued)

(56) References Cited

U.S. PATENT DOCUMENTS

2002/0172569 A1* 11/2002 Nakamura ............ B23B 27/007
408/226
2007/0274794 A1  11/2007  Cirino
(Continued)

FOREIGN PATENT DOCUMENTS

DE   102006005880 A1   8/2007
JP      2005-161462 A   6/2005
(Continued)

*Primary Examiner* — Sunil K Singh
*Assistant Examiner* — Dustin James Trujillo
(74) *Attorney, Agent, or Firm* — XSENSUS LLP (57) ABSTRACT

A drill head includes a first attachment surface attached to a holder, a head tip surface opposite to the first attachment surface in an axial direction along the central axis, and a head outer peripheral surface continuous with the first attachment surface and the head tip surface. The head outer peripheral surface is provided with a first flute and a second flute extending helically about the central axis from the head tip surface to reach the first attachment surface. The first flute and the second flute are symmetric with respect to the central axis. Each of the first flute and the second flute has a first end and a second end that face each other with a space between them in a circumferential direction along a circumference centered on the central axis.

11 Claims, 7 Drawing Sheets

(58) Field of Classification Search
CPC ........ B23B 2200/161; B23B 2200/168; B23B 51/0002; B23B 51/0007; B23B 51/02; B23B 51/0005; Y10T 408/90993; Y10T 408/90987; Y10T 408/9098
See application file for complete search history.

(56) References Cited

U.S. PATENT DOCUMENTS

| | | |
|---|---|---|
| 2009/0136303 A1 | 5/2009 | Kress et al. |
| 2010/0322731 A1 | 12/2010 | Aare |
| 2013/0017028 A1* | 1/2013 | Fang ..................... B23B 51/02 408/229 |
| 2019/0232388 A1 | 8/2019 | Mori et al. |

FOREIGN PATENT DOCUMENTS

| | | |
|---|---|---|
| JP | 2009-523073 A | 6/2009 |
| JP | 2011-5631 A | 1/2011 |
| JP | 2016-508889 A | 3/2016 |
| WO | 02/05990 A1 | 1/2002 |
| WO | 2014/138184 A1 | 9/2014 |
| WO | 2017/150459 A1 | 9/2017 |

* cited by examiner

DRILL HEAD AND DRILL

CROSS-REFERENCE TO RELATED APPLICATIONS

The present application is based on PCT filing PCT/JP2021/041746, filed Nov. 12, 2021, which claims priority to JP 2020-208320, filed Dec. 16, 2020, the entire contents of each are incorporated herein by reference.

TECHNICAL FIELD

The present disclosure relates to a drill head and a drill.

BACKGROUND ART

PTL 1 (International Patent Publication No. 2002/005990) discloses a drill. The drill disclosed in PTL 1 includes a cutting head and a holder. The cutting head has a bearing surface. The holder has a front surface.

The bearing surface is provided with a plurality of protrusions extending along a radial direction. Each of the plurality of protrusions has a height increasing toward an outer side in the radial direction. The front surface is provided with a plurality of recesses along the radial direction. Each of the plurality of recesses has a depth increasing toward the outer side in the radial direction. The cutting head is attached to the holder by fitting each of the plurality of protrusions into each of the plurality of recesses.

CITATION LIST

Patent Literature

PTL 1: International Patent Publication No. 2002/005990

SUMMARY OF INVENTION

A drill head of the present disclosure is rotated about a central axis. The drill head includes a first attachment surface attached to a holder, a head tip surface opposite to the first attachment surface in an axial direction along the central axis, and a head outer peripheral surface continuous with the first attachment surface and the head tip surface. The head outer peripheral surface is provided with a first flute and a second flute extending helically about the central axis from the head tip surface to reach the first attachment surface. The first flute and the second flute are symmetric with respect to the central axis. When the first attachment surface is viewed along the central axis and in a direction from the first attachment surface toward the head tip surface, each of the first flute and the second flute has a first end and a second end on the first attachment surface, the first end and the second end facing each other with a space between them in a circumferential direction along a circumference centered on the central axis. The first attachment surface is provided with a first ridge, a second ridge, and a third ridge extending along the radial direction orthogonal to the axial direction. The first ridge is located between the first end of the first flute and the second end of the second flute in the circumferential direction. The second ridge and the third ridge are located between the second end of the first flute and the first end of the second flute in the circumferential direction. The second ridge is located closer to the second end of the first flute than the third ridge in the circumferential direction. An angle formed by a virtual straight line passing through a center of the first ridge in the radial direction and a virtual straight line passing through the central axis and the first end of the first flute is equal to an angle formed by the virtual straight line passing through the center of the first ridge in the radial direction and a virtual straight line passing through the central axis and the second end of the second flute.

DETAILED DESCRIPTION

Problem to be Solved by the Present Disclosure

In the drill disclosed in PTL 1, a maximum value of a depth of the recesses and a maximum value of a height of the protrusions decrease as an outer diameter of the drill (an outer diameter of the cutting head) decreases. Thus, in the drill disclosed in PTL 1, a fitting force between the recesses and the protrusions decreases as the outer diameter of the drill decreases, and a support of the cutting head by the holder may become unstable. Since the drill is a rotary tool, not only the stability of the support of the cutting head by the holder but also a tool balance needs to be maintained. Here, the tool balance means a distribution of amass of the rotary tool. The tool balance is determined by a distance from the central axis to the mass and an arrangement of the mass in a cross section perpendicular to a central axis of the rotary tool. A good tool balance means that centrifugal force applied to the rotary tool when the rotary tool is rotated at a predetermined rotation speed is small. Maintaining the tool balance means that the tool balance is good even when an outer diameter of the rotary tool becomes small.

The present disclosure provides a drill head capable of maintaining stability of support by a holder and a tool balance even when an outer diameter of the drill head decreases.

Advantageous Effect of the Present Disclosure

The drill head of the present disclosure can maintain the stability of support by the holder and the tool balance even when the outer diameter of the drill head decreases.

DESCRIPTION OF EMBODIMENTS

First, embodiments of the present disclosure will be listed and described.

(1) A drill head according to one embodiment is rotated about a central axis. The drill head includes a first attachment surface attached to a holder, a head tip surface opposite to the first attachment surface in an axial direction along the central axis, and a head outer peripheral surface continuous with the first attachment surface and the head tip surface. The head outer peripheral surface is provided with a first flute and a second flute extending helically about the central axis from the head tip surface to reach the first attachment surface. The first flute and the second flute are symmetric with respect to the central axis. When the first attachment surface is viewed along the central axis and in a direction from the first attachment surface toward the head tip surface, each of the first flute and the second flute has a first end and a second end on the first attachment surface, the first end and the second end facing each other with a space between them in a circumferential direction along a circumference centered on the central axis. The first attachment surface is provided with a first ridge, a second ridge, and a third ridge extending along the radial direction orthogonal to the axial direction. The first ridge is located between the first end of the first flute and the second end of the second flute in the circumferential direction. The second ridge and the third ridge are located between the second end of the first flute and the first end of the second flute in the circumferential direction. The second ridge is located closer to the second end of the first flute than the third ridge in the circumferential direction. An angle formed by a virtual straight line passing through a center of the first ridge in the radial direction and a virtual straight line passing through the central axis and the first end of the first flute is equal to an angle formed by the virtual straight line passing through the center of the first ridge in the radial direction and a virtual straight line passing through the central axis and the second end of the second flute.

The drill head of (1) can maintain stability of support by the holder and a tool balance even when an outer diameter of the drill head decreases.

(2) In the drill head of (1), the angle formed by the virtual straight line passing through the center of the first ridge in the radial direction and the virtual straight line passing through the central axis and the first end of the first flute may be 30° or more and 70° or less.

(3) In the drill head of (1) or (2), an angle formed by the virtual straight line passing through the center of the first ridge in the radial direction and a virtual straight line passing through a center of the second ridge in the radial direction may be 150° or more and 170° or less, and an angle formed by the virtual straight line passing through the center of the first ridge in the radial direction and a virtual straight line passing through a center of the third ridge in the radial direction may be 150° or more and 170° or less.

(4) In the drill head of (3), an angle formed by the virtual straight line passing through the center of the second ridge in the radial direction and the virtual straight line passing through the center of the third ridge in the radial direction may be 20° or more and 60° or less, In the drill head of (3) and (4), an arrangement of the first ridge, the second ridge, and the third ridge in the circumferential direction becomes closer to a uniform arrangement, and thus the tool balance is improved.

(5) In the drill head of (4), when the first attachment surface is viewed along the central axis and in the direction from the first attachment surface toward the head tip surface, the first flute may be twisted such that an intersection line between the first flute and the head outer peripheral surface extends clockwise from the second end of the first flute along the circumferential direction. An angle formed by the virtual straight line passing through the center of the second ridge in the radial direction and a virtual straight line passing through the central axis and the second end of the first flute may be larger than an angle formed by the virtual straight line passing through the center of the third ridge in the radial direction and a virtual straight line passing through the central axis and the first end of the second flute.

The drill head of (5) equalizes a stress applied to a groove fitted to the second ridge and a stress applied to a groove fitted to the third ridge, and can suppress uneven wear in the groove fitted to the second ridge.

(6) In the drill head of (5), the first ridge may have a width that is 1.1 times or more and 2.0 times or less a width of the second ridge and a width of the third ridge.

The drill head of (6) can equalize a stress applied to a groove fitted to the first ridge and the stresses applied to the groove fitted to the second ridge and the groove fitted to the third ridge, and can suppress uneven wear in the groove fitted to the first ridge.

(7) A drill according to one aspect of the present disclosure includes the holder and the drill head of (1) to (6). The holder has a second attachment surface in contact with the first attachment surface. The second attachment surface is provided with a first groove, a second groove, and a third groove that extend along a radial direction. The first groove, the second groove, and the third groove are fitted to the first ridge, the second ridge, and the third ridge, respectively.

(8) A drill according to another aspect of the present disclosure includes a drill head, a holder, and a fixing member. The drill head includes a first attachment surface attached to the holder, a head tip surface opposite to the first attachment surface in an axial direction along a central axis of the drill head, a head outer peripheral surface continuous with the first attachment surface and the head tip surface, and a shank shaft extending along the axial direction from the first attachment surface. The head outer peripheral surface is provided with a first flute and a second flute extending helically about the central axis from the head tip surface to reach the first attachment surface. The first flute and the second flute are symmetric with respect to the central axis. When the first attachment surface is viewed along the central axis and in a direction from the first attachment surface toward the head tip surface, each of the first flute and the second flute has a first end and a second end on the first attachment surface, the first end and the second end facing each other with a space between them in a circumferential direction along a circumference centered on the central axis. The first attachment surface is provided with a first ridge, a second ridge, and a third ridge extending along the radial direction orthogonal to the axial direction. The first ridge is located between the first end of the first flute and the second end of the second flute in the circumferential direction. The second ridge and the third ridge are located between the second end of the first flute and the first end of the second flute in the circumferential direction. The second ridge is located closer to the second end of the first flute than the third ridge in the circumferential direction. An angle formed by a virtual straight line passing through a center of the first ridge in the radial direction and a virtual straight line passing through a center of the second ridge in the radial direction is larger than an angle formed by the virtual straight line passing through the center of the first ridge in the radial direction and a virtual straight line passing through a center of the third ridge in the radial direction. The shank shaft is provided with a notch. The holder has a second attachment surface in contact with the first attachment surface, and a holder outer peripheral surface continuous with the second attachment surface. The second attachment surface is provided with a first hole into which the shank shaft is inserted, and a first groove, a second groove, and a third groove that extend along the radial direction. The first groove, the second groove, and the third groove are fitted to the first ridge, the second ridge, and the third ridge, respectively. The holder outer peripheral surface is provided with a second hole continuous with the first hole. The fixing member is in contact with the notch by being inserted into the second hole.

In the drill of (8), by attaching the first attachment surface to the second attachment surface, the shank shaft can be positioned at a position where the shank shaft can be fixed using the fixing member.

Details of Embodiments of the Present Disclosure

Hereinafter, the embodiments of the present disclosure will be described in detail with reference to the drawings. In the drawings described below, the same or corresponding parts are denoted by the same reference signs, and redundant description will not be repeated.
(Configuration of Drill According to Embodiment)

A configuration of a drill (hereinafter referred to as a "drill 100") according to an embodiment will be described.

Figure 1:
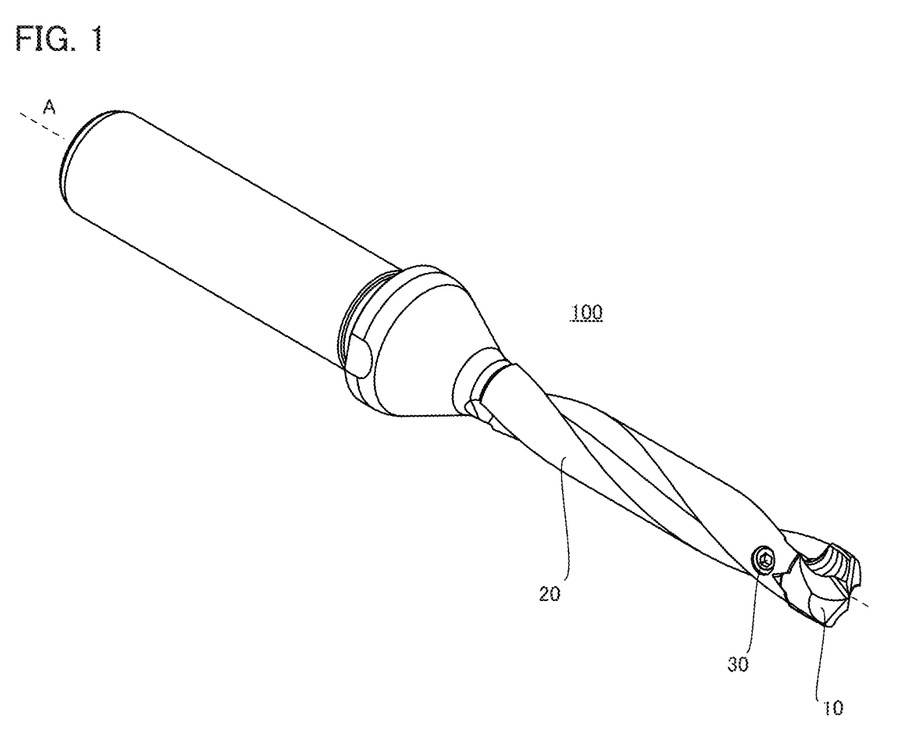
FIG. 1 is a perspective view of a drill 100.

FIG. 1 is a perspective view of drill 100. As illustrated in FIG. 1, drill 100 includes a drill head 10, a holder 20, and a fixing member 30. Drill 100 is rotated about a central axis A to perform cutting. Drill head 10 includes, for example, cemented carbide. Holder 20 and fixing member 30 include, for example, steel. In a direction along central axis A, drill head 10 is at a distal end of drill 100, and holder 20 is at a proximal end of drill 100. In the direction along central axis A, the proximal end of drill 100 is opposite to the distal end of drill 100. Drill 100 is attached to a spindle of a machine tool in holder 20 to be rotated about central axis A.
<Drill Head 10>

Figure 2:
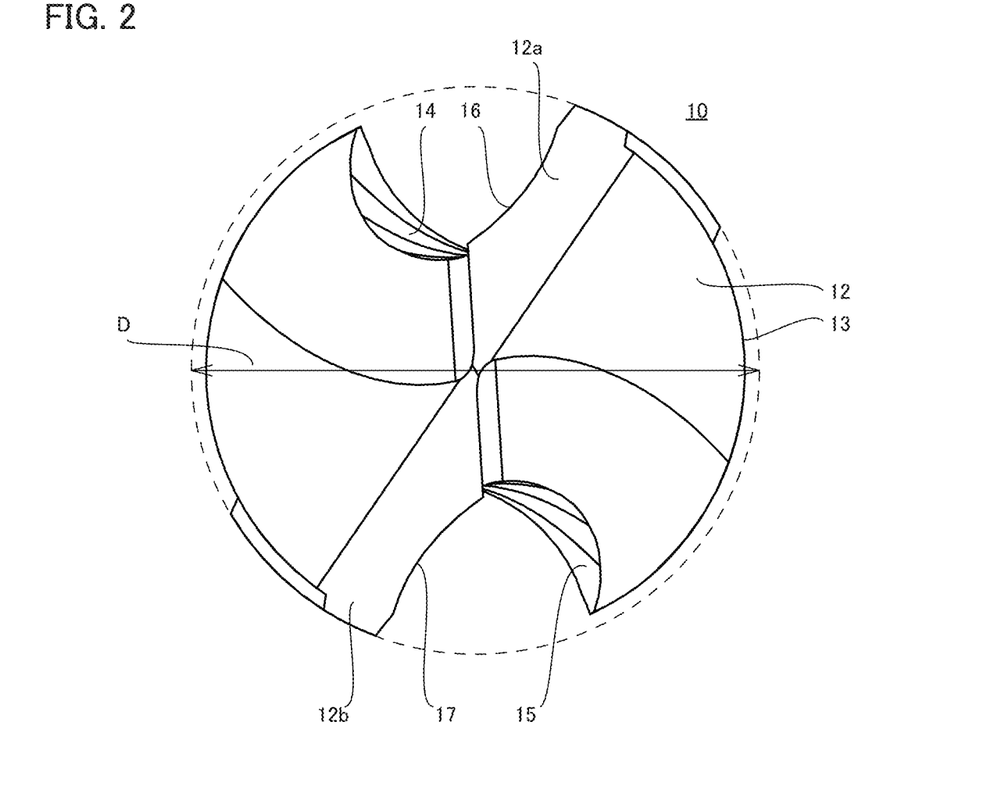
FIG. 2 is a front view of a drill head 10.
Figure 3:
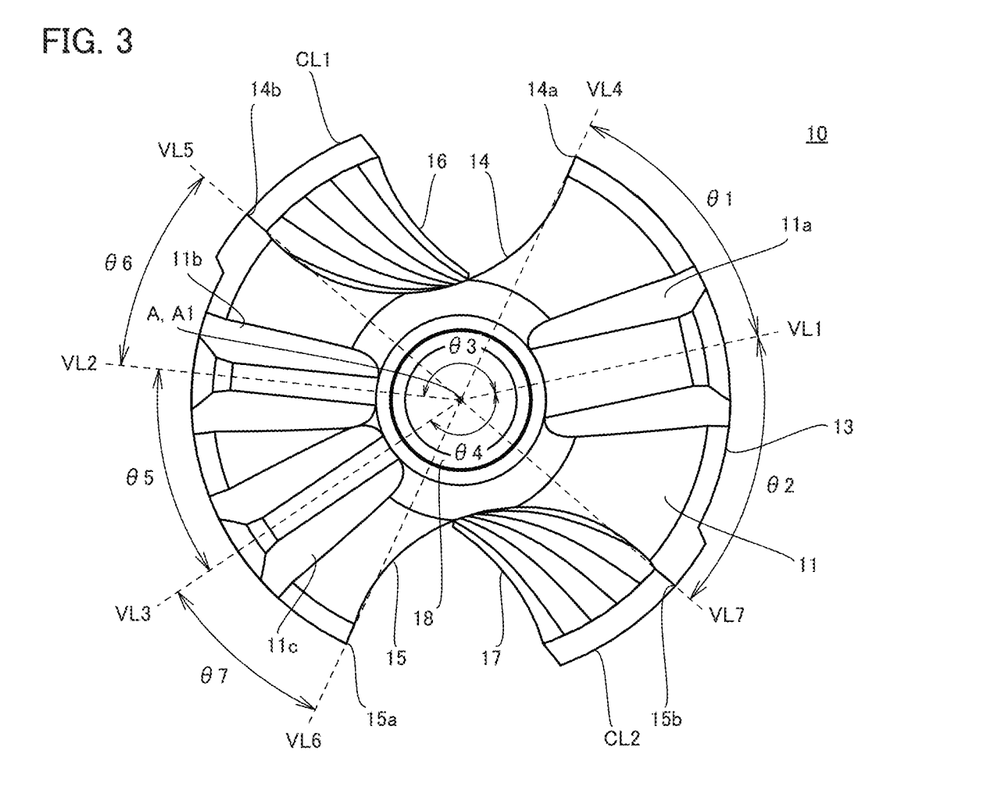
FIG. 3 is a rear view of drill head 10.
Figure 4:
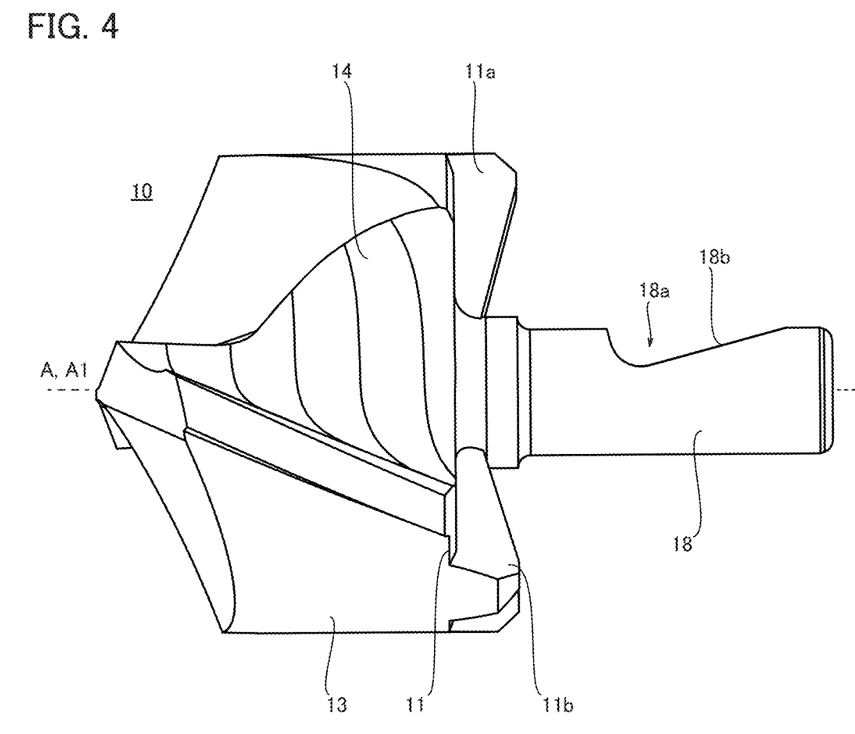
FIG. 4 is a side view of drill head 10.

Drill head 10 is rotated about a central axis A1 when drill 100 is rotated about central axis A. Central axis A1 coincides with central axis A. Hereinafter, the direction along central axis A is defined as an axial direction, a direction orthogonal to central axis A is defined as a radial direction, and a direction along a circumference centered on central axis A in a plane orthogonal to central axis A is defined as a circumferential direction. FIG. 2 is a front view of drill head 10. FIG. 3 is a rear view of drill head 10. FIG. 4 is a side view of drill head 10. As illustrated in FIGS. 2, 3, and 4, drill head 10 includes a first attachment surface 11, a head tip surface 12, and a head outer peripheral surface 13.

First attachment surface 11 and head tip surface 12 are end surfaces of drill head 10 in the axial direction. Drill head 10 is attached to holder 20 on first attachment surface 11. Head tip surface 12 is located at the distal end of drill 100.

Head tip surface 12 is a surface opposite to first attachment surface 11 in the axial direction. Head outer peripheral surface 13 is continuous with first attachment surface 11 and head tip surface 12.

Head outer peripheral surface 13 is provided with a first flute 14 and a second flute 15. Head outer peripheral surface 13 is recessed toward central axis A1 at a portion where first flute 14 and second flute 15 are formed. First flute 14 and second flute 15 extend helically about central axis A1 from head tip surface 12 to reach first attachment surface 11. First flute 14 and second flute 15 are symmetric with respect to central axis A1. In an example shown in FIGS. 2, 3, and 4, first flute 14 and second flute 15 twist clockwise from head tip surface 12 toward first attachment surface 11 when viewed from head tip surface 12 along the axial direction. From another point of view, the first flute and the second flute are right-twisted. From another point of view, the first flute and the second flute have a helical shape.

Head tip surface 12 has a flank 12a and a flank 12b. Flank 12a and first flute 14 intersect each other. Flank 12b and second flute 15 intersect each other. An intersecting ridge line between flank 12a and first flute 14 is a cutting edge 16, and an intersecting ridge line between flank 12b and second flute 15 is a cutting edge 17. Cutting edge 16 and cutting edge 17 extend from head outer peripheral surface 13 toward a center of head tip surface 12 (distal end of drill 100). Cut pieces (chip) cut by cutting edges 16 and 17 are discharged through first flute 14 and second flute 15, respectively. That is, first flute 14 and second flute 15 are grooves formed for discharging chip.

First flute 14 has a first end 14a and a second end 14b. Second end 14b faces first end 14a with a space apart in the circumferential direction. When moving from a location of second end 14b toward head tip surface 12 along an extending direction of first flute 14 on head outer peripheral surface 13, second end 14b becomes continuous with an end of cutting edge 16 near head outer peripheral surface 13.

Second flute 15 has a first end 15a and a second end 15b. Second end 15b faces first end 15a with a space apart in the circumferential direction. When moving from a location of second end 15b toward head tip surface 12 along an extending direction of second flute 15 on head outer peripheral surface 13, second end 15b becomes continuous with an end of cutting edge 17 near head outer peripheral surface 13.

First attachment surface 11 is provided with a first ridge 11a, a second ridge 11b, and a third ridge 11c. First ridge 11a, second ridge 11b, and third ridge 11c extend in the radial direction. First ridge 11a, second ridge 11b, and third ridge 11c extend from head outer peripheral surface 13 toward central axis A1. First ridge 11a, second ridge 11b, and third ridge 11c protrude from first attachment surface 11 along the axial direction.

First ridge 11a is located between first end 14a of first flute 14 and second end 15b of second flute 15 in the circumferential direction. Second ridge 11b and third ridge 11c are located between second end 14b of first flute 14 and first end 15a of second flute 15 in the circumferential direction. In the circumferential direction, second ridge 11b is closer to second end 14b of first flute 14 than third ridge 11c. From another point of view, first ridge 11a, second ridge 11b, and third ridge 11c are asymmetric with respect to central axis A1.

As illustrated in FIG. 3, on first attachment surface 11, a virtual straight line passing through a center of first ridge 11a is in the radial direction is defined as a virtual straight line VL1. Similarly, a virtual straight line passing through a center of second ridge 11b in the radial direction is defined as a virtual straight line VL2, and a virtual straight line passing through a center of third ridge 11c in the radial direction is defined as a virtual straight line VL3. Virtual straight line VL1, virtual straight line VL2, and virtual straight line VL3 are orthogonal to central axis A1.

As illustrated in FIG. 3, a virtual straight line passing through first end 14a of first flute 14 and central axis A1 is defined as a virtual straight line VL4. Similarly, a virtual straight line passing through second end 14b of first flute 14 and central axis A1 is defined as a virtual straight line VL5. Similarly, a virtual straight line passing through first end 15a of second flute 15 and central axis A1 is defined as a virtual straight line VL6. Similarly, a virtual straight line passing through second end 15b of second flute 15 and central axis A1 is defined as a virtual straight line VL7. Virtual straight line VL4, virtual straight line VL5, virtual straight line VL6, and virtual straight line VL7 are orthogonal to central axis A1.

An angle $\theta 1$ formed by virtual straight line VL1 and virtual straight line VL4 is equal to an angle $\theta 2$ formed by virtual straight line VL1 and virtual straight line VL7. However, as long as the effect of the present invention is exhibited, a minute angular error between angle θ1 and angle θ2 is allowed. Angle θ1 and angle θ2 are, for example, 30° or more and 70° or less.

An angle θ3 formed by virtual straight line VL1 and virtual straight line VL2 is equal to an angle θ4 formed by virtual straight line VL1 and virtual straight line VL3. That is, second ridge 11b and third ridge 11c are preferably asymmetric with respect to virtual straight line VL1. Angle θ3 and angle θ4 are, for example, 150° or more and 170° or less.

An angle θ5 formed by virtual straight line VL2 and virtual straight line VL3 is preferably 20° or more and 60° or less. A sum of angle θ3, angle θ4, and angle θ5 is 360°.

As described above, first flute 14 and second flute 15 have a clockwise helical shape when viewed from head tip surface 12. Thus, when first attachment surface 11 is viewed along central axis A1 and in the direction from first attachment surface 11 toward head tip surface 12, first flute 14 is twisted such that an intersection line (CL1 in FIG. 3) between first flute 14 and head outer peripheral surface 13 extends clockwise from second end 14b of first flute 14 along the circumferential direction. Similarly, second flute 15 is twisted such that an intersection line (CL2 in FIG. 3) between second flute 15 and head outer peripheral surface 13 extends clockwise from second end 15b of second flute 15 along the circumferential direction. An angle θ6 formed by virtual straight line VL2 and virtual straight line VL5 is equal to an angle θ7 formed by virtual straight line VL3 and virtual straight line VL6.

A width of first ridge 11a, a width of second ridge 11b, and a width of third ridge 11c are defined as a first width, a second width, and a third width, respectively. The first width, the second width, and the third width are widths in directions orthogonal to extending directions of the respective ridges, and are measured at ends of the respective ridges on head outer peripheral surface 13. The first width is preferably larger than the second width and the third width. Specifically, the first width is preferably 1.1 times or more and 2.0 times or less the second width and the third width. For example, the second width is equal to the third width.

As illustrated in FIG. 4, first attachment surface 11 is provided with a shank shaft 18. Shank shaft 18 extends from a center of first attachment surface 11 along the axial direction. A cross section orthogonal to the axial direction of shank shaft 18 is, for example, circular except for a portion where a notch 18a described later is formed.

Shank shaft 18 is provided with notch 18a. Notch 18a has an inclined surface 18b. Inclined surface 18b is inclined with respect to the axial direction (direction in which shank shaft 18 extends). Specifically, when a normal vector of inclined surface 18b is V1 and a unit vector in a direction from a distal end of shank shaft 18 (an end opposite to first attachment surface 11) toward a proximal end of shank shaft 18 (an end near first attachment surface 11) is V2, an angle formed by V1 and V2 is smaller than 90°. From another point of view, an area of the cross section of shank shaft 18 that intersects the inclined surface 18b and is orthogonal to the axial direction of shank shaft 18 monotonously decreases from the distal end of shank shaft 18 toward the proximal end of shank shaft 18 along central axis A1.

An outer diameter of drill head 10 is defined as an outer diameter D. As illustrated in FIG. 2, outer diameter D is a diameter of a circumscribed circle of drill head 10 when viewed from head tip surface 12 along the axial direction. Outer diameter D is preferably less than or equal to 15 mm. Outer diameter D is, for example, greater than or equal to 6 mm.

<Holder 20 and Fixing Member 30>

Figure 5:
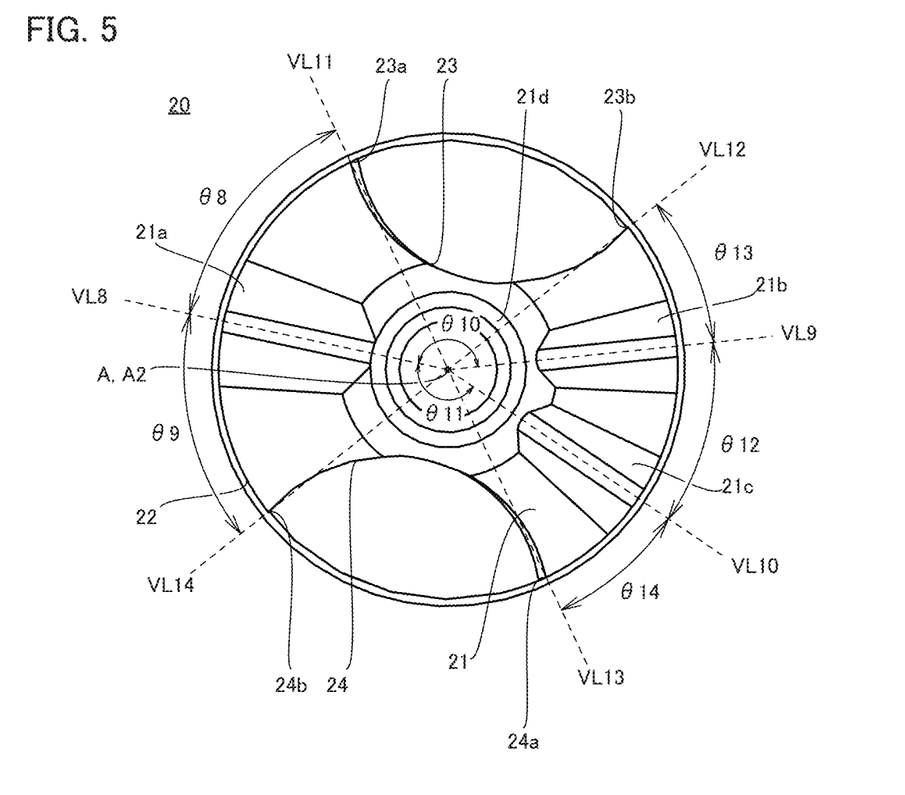
FIG. 5 is a front view of a holder 20.
Figure 6:
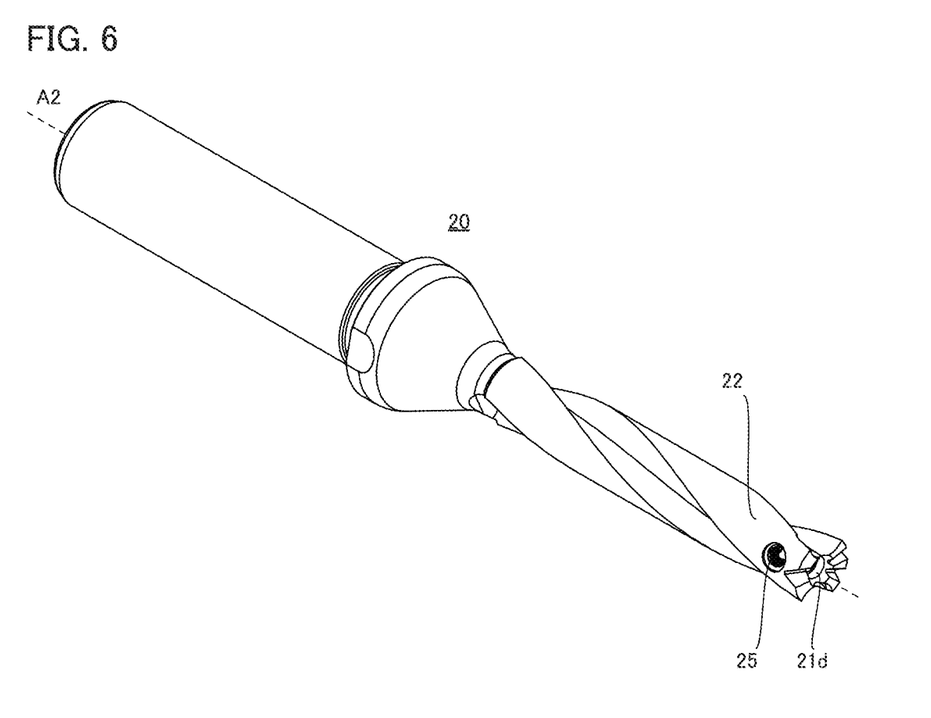
FIG. 6 is a perspective view of holder 20.

FIG. 5 is a front view of holder 20. FIG. 6 is a perspective view of holder 20. As illustrated in FIGS. 5 and 6, holder 20 extends along the axial direction. Holder 20 has a second attachment surface 21 and a holder outer peripheral surface 22. Holder 20 is rotated about a central axis A2. Central axis A2 coincides with central axis A.

Second attachment surface 21 is an end surface of holder 20 in the axial direction. Second attachment surface 21 is provided with a first groove 21a, a second groove 21b, and a third groove 21c. First groove 21a, second groove 21b, and third groove 21c extend in the radial direction. First groove 21a, second groove 21b, and third groove 21c extend from head outer peripheral surface 13 toward a center of second attachment surface 21. First groove 21a, second groove 21b, and third groove 21c are recessed from second attachment surface 21 along the axial direction.

Holder outer peripheral surface 22 is continuous with second attachment surface 21. Holder outer peripheral surface 22 is provided with a flute 23 and a flute 24. Holder outer peripheral surface 22 is recessed toward central axis A2 at a portion where flute 23 and flute 24 are formed. Flute 23 and flute 24 are helical about the central axis holder 20. Flute 23 and flute 24 extend from second attachment surface 21 toward the proximal end of drill 100. Flute 23 and flute 24 are twisted in the same direction as first flute 14 and second flute 15 when viewed from second attachment surface 21. That is, flute 23 and flute 23 are twisted clockwise when viewed from second attachment surface 21. Flute 23 and flute 24 are connected to first flute 14 and second flute 15, respectively.

Flute 23 has a first end 23a and a second end 23b. Second end 23b faces first end 23a with a space apart in the circumferential direction. First end 23a is an end of flute 23 in the circumferential direction, corresponding to first end 14a, and second end 23b is an end of flute 23 in the circumferential direction, corresponding to second end 14b.

Flute 24 has a first end 24a and a second end 24b. Second end 24b faces first end 24a with a space apart in the circumferential direction. First end 24a is an end of flute 24 in the circumferential direction, corresponding to first end 15a, and second end 24b is an end of flute 24 in the circumferential direction, corresponding to second end 15b.

First groove 21a is located between first end 23a of flute 23 and second end 24b of flute 24 in the circumferential direction. Second groove 21b and third groove 21c are located between second end 23b of flute 23 and first end 24a of flute 24 in the circumferential direction. In the circumferential direction, second groove 21b is closer to second end 23b of flute 23 than third groove 21c. From another point of view, first groove 21a, second groove 21b, and third groove 21c are asymmetric with respect to central axis A2.

As illustrated in FIG. 5, on second attachment surface 21, a virtual straight line passing through a center of first groove 21a in the radial direction is defined as a virtual straight line VL8. Similarly, a virtual straight line passing through a center of second groove 21b in the radial direction is defined as a virtual straight line VL9. Similarly, a virtual straight line passing through a center of third groove 21c in the radial direction is defined as a virtual straight line VL10. Virtual straight line VL8, virtual straight line VL9, and virtual straight line VL10 are orthogonal to central axis A2.

As illustrated in FIG. 5, a virtual straight line passing through first end 23a of flute 23 and central axis A2 on second attachment surface 21 is defined as a virtual straight line VL11. Similarly, a virtual straight line passing through second end 23b of flute 23 and central axis A2 is defined as a virtual straight line VL12. Similarly, a virtual straight line passing through first end 24a of flute 24 and central axis A2 is defined as a virtual straight line VL13. Similarly, a virtual straight line passing through second end 24b of flute 24 and central axis A2 is defined as a virtual straight line VL14. Virtual straight line VL11, virtual straight line VL12, virtual straight line VL13, and virtual straight line VL14 are orthogonal to central axis A2.

An angle θ8 formed by virtual straight line VL8 and virtual straight line VL11 and an angle θ9 formed by virtual straight line VL8 and virtual straight line VL14 are equal to angle θ1 and angle θ2, respectively. An angle θ10 formed by virtual straight line VL8 and virtual straight line VL9 and an angle θ11 formed by virtual straight line VL8 and virtual straight line VL10 are equal to angle θ4 and angle θ5, respectively. As a result, when first groove 21a faces first ridge 11a, second groove 21b and third groove 21c face second ridge 11b and third ridge 11c, respectively. An angle θ12 formed by virtual straight line VL9 and virtual straight line V10 is equal to angle θ5.

First groove 21a, second groove 21b, and third groove 21c have such shapes that can be fitted to first ridge 11a, second ridge 11b, and third ridge 11c, respectively. Therefore, first attachment surface 11 are brought into contact with second attachment surface 21 such that first groove 21a, second groove 21b, and third groove 21c face first ridge 11a, second ridge 11b, and third ridge 11c, respectively, to attach drill head 10 to holder 20.

As described above, flute 23 and flute 24 have a clockwise helical shape when viewed from second attachment surface 21. Therefore, when second attachment surface 21 is viewed along central axis A2 and in a direction from second attachment surface 21 toward the proximal end of holder 20 (that is, the proximal end of drill 100), flute 23 is twisted such that an intersection line between flute 23 and holder outer peripheral surface 22 extends clockwise from first end 23a of flute 23 along the circumferential direction. Similarly, flute 24 is twisted such that an intersection line between flute 24 and holder outer peripheral surface 22 extends clockwise along the circumferential direction from first end 24a of flute 24.

An angle θ13 formed by virtual straight line VL9 and virtual straight line VL12 and an angle θ14 formed by virtual straight line VL10 and virtual straight line VL13 are equal to angle θ6 and angle θ7, respectively.

A width of first groove 21a, a width of second groove 21b, and a width of third groove 21c are defined as a fourth width, a fifth width, and a sixth width, respectively. The fourth width, the fifth width, and the sixth width are widths in directions orthogonal to extending directions of the respective grooves, and are measured at ends of the respective grooves on holder outer peripheral surface 22. The fourth width is preferably larger than the fifth width and the sixth width. Specifically, the fourth width is preferably 1.1 times or more and 2.0 times or less the fifth width and the sixth width. For example, the fifth width is equal to the sixth width.

Second attachment surface 21 is provided with a first hole 21d. First hole 21d is formed at the center of second attachment surface 21. First hole 21d extends along the axial direction. Shank shaft 18 is inserted into first hole 21d with drill head 10 attached to holder 20.

Holder outer peripheral surface 22 is provided with a second hole 25. Second hole 25 is connected to first hole 21d. Second hole 25 extends in a direction intersecting inclined surface 18b. When holder outer peripheral surface 22 is viewed along an extending direction of second hole 25, inclined surface 18b is exposed from second hole 25.

Fixing member 30 is inserted into second hole 25. Specifically, a thread groove is formed on an inner wall surface of second hole 25, and fixing member 30 is a bolt having a thread formed on a shaft. Fixing member 30 is inserted into second hole 25 by rotating fixing member 30 into second hole 25. When fixing member 30 is rotated, fixing member 30 advances in second hole 25 along the extending direction of second hole 25 and comes into contact with inclined surface 18b. As a result, shank shaft 18 is drawn into a tip of first hole 21d (an end opposite to second attachment surface 21), and drill head 10 is fixed to holder 20.

(Effects of Drill According to Embodiment)

Hereinafter, effects of drill 100 will be described.

First attachment surface 11 is provided with first ridge 11a fitted into first groove 21a, second ridge 11b fitted into second groove 21b, and third ridge 11e fitted into third groove 21c. Thus, drill head 10 is supported at three points while being attached to holder 20. Drill head 10 is therefore stably supported by holder 20.

For example, as disclosed in PTL 1, in order to secure a fitting force with holder 20, it is conceivable to form a large number of ridges that increase in height toward an outer side in the radial direction on first attachment surface 11 and to form a large number of grooves that increase in depth toward an outer side in the radial direction on second attachment surface 21. However, when the diameter of drill head 10 is reduced for the following reasons, it is difficult to form a large number of ridges. When the diameter of drill head 10 is reduced while maintaining the number and height of the ridges, the width of the ridges in the circumferential direction decreases. Then, a mechanical strength of the ridges decreases, and it is thus necessary to lower the ridges with respect to first attachment surface 11. In this case, as the ridges become low, the corresponding grooves become shallow. As a result, the fitting force between the ridges and the grooves may decrease. That is, there is a possibility that the support of drill head 10 by holder 20 becomes unstable.

On the other hand, in drill 100, drill head 10 is supported by holder 20 by three points with three ridges, e.g., only three ridges, (first ridge 11a, second ridge 11b, and third ridge 11c) formed on first attachment surface 11 and three grooves (first groove 21a, second groove 21b, and third groove 21c) formed on second attachment surface 21. Therefore, drill head 10 can be stably supported even when the outer diameter of drill head 10 is small.

In drill head 10, angle θ1 and angle θ2 are equal. In holder 20, angle θ8 and angle θ9 are equal to angle θ1 and angle θ2, respectively. That is, in drill 100, first ridge 11a is disposed between first flute 14 and second flute 15 in the circumferential direction, and first groove 21a is disposed between flute 23 and flute 24 in the circumferential direction. Therefore, drill 100 can maintain the tool balance.

When angle θ3 and angle θ4 are 150° or more and 170° or less (when angle θ5 is 20° or more and 60° or less), the arrangement of first ridge 11a, second ridge 11b, and third ridge 11c (first groove 21a, second groove 21b, and third groove 21c) in the circumferential direction becomes close to the uniform arrangement. Therefore, in this case, the tool balance of drill 100 is further improved.

Figure 7:
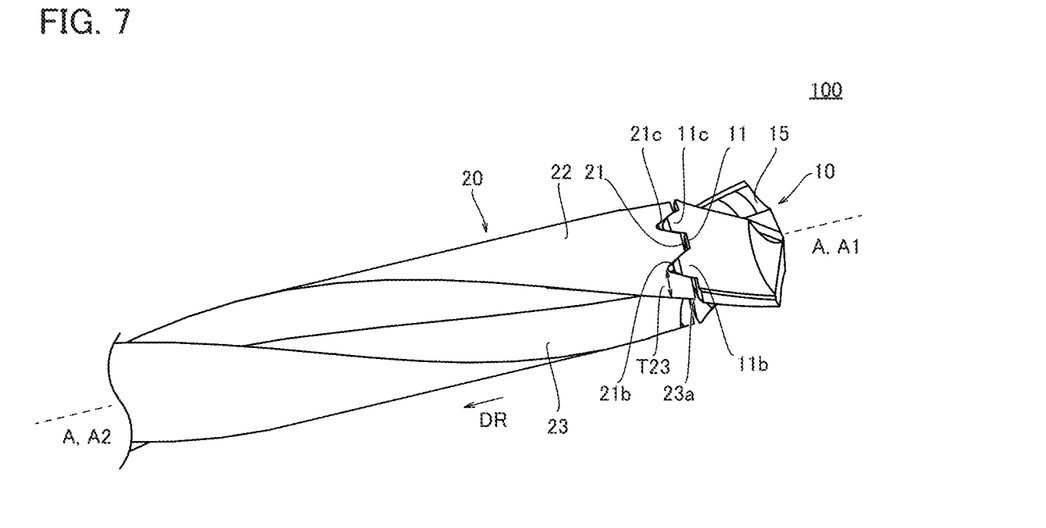
FIG. 7 is an enlarged perspective view of drill 100.

FIG. 7 is an enlarged perspective view of drill 100. As illustrated in FIG. 7, in holder 20, when second attachment surface 21 is viewed along central axis A2 and in a direction DR from second attachment surface 21 toward the proximal end of holder 20 (that is, the proximal end of drill 100), flute 23 is twisted such that an intersection line between flute 23 and holder outer peripheral surface 22 extends clockwise from first end 23a of flute 23 along the circumferential direction. Similarly, flute 24 is twisted such that an intersection line between flute 24 and holder outer peripheral surface 22 extends clockwise along the circumferential direction from first end 24a of flute 24.

Since flute 23 and flute 24 are disposed as described above, a thickness of flute 23 near second groove 21b is smaller than a thickness of flute 24 near third groove 21c. Specifically, a thickness T23 which is the shortest distance between the deepest portion of second groove 21b along direction DR and flute 23 is smaller than a thickness T24 (not shown) which is the shortest distance between the deepest portion of third groove 21c along direction DR and flute 24. Thus, a stress near second groove 21b tends to be larger than a stress near third groove 21c. In order to relax the stress near second groove 21b, angle θ6 is made larger than angle θ7 in drill head 10, and correspondingly, in a case where angle θ13 is larger than angle θ14 in holder 20, the thickness of flute 23 in the circumferential direction and the axial direction near second groove 21b increases. Therefore, in this case, the stress applied to second groove 21b is relaxed. As a result, uneven wear in second grooves 21b is suppressed.

Since a cutting force is supported by one groove (first groove 21a) between first end 23a of flute 23 and second end 24b of flute 24, and the cutting force is supported by two grooves (second groove 21b and third groove 21c) between second end 23b of flute 23 and first end 24a of flute 24, the stress is more likely to be applied to first groove 21a than to second groove 21b and third groove 21c. Therefore, when the first width is larger than the second width and the third width (the fourth width is larger than the fifth width and the sixth width), the stress near first groove 21a is relaxed. As a result, uneven wear in first grooves 21a is suppressed.

There is one ridge (first ridge 11a) between first end 14a of first flute 14 and second end 15b of second flute 15, and there are two ridges (second ridge 11b and third ridge 11c) between second end 14b of first flute 14 and first end 15a of second flute 15. Therefore, the arrangement of first ridge 11a, second ridge 11b, and third ridge 11c is asymmetric with respect to central axis A1. When angle θ3 and angle θ4 are different from each other, the arrangement of second ridge 11b and third ridge 11c is asymmetric with respect to virtual straight line VL1. That is, drill head 10 cannot be attached to holder 20 unless first ridge 11a, second ridge 11b, and third ridge 11c are fitted into first groove 21a, second groove 21b, and third groove 21c, respectively.

Therefore, when angle θ3 and angle θ4 are different from each other, drill head 10 can be positioned with respect to holder 20 by first ridge 11a, second ridge 11b, and third ridge 11c. From another point of view, since inclined surface 18b is always exposed from second hole 25 when drill head 10 is attached to holder 20, it is not necessary to form notches 18a at a plurality of locations in order to pull and fix drill head 10 by fixing member 30. That is, it is possible to suppress a decrease in rigidity of shank shaft 18 due to the formation of notch 18a.

It should be understood that the embodiments disclosed herein are illustrative in all respects and not restrictive. The scope of the present invention is defined not by the above embodiments but by the claims and is intended to include meanings equivalent to the claims and all modifications within the scope.

REFERENCE SIGNS LIST

100: drill, 10: drill head, 11: first attachment surface, 11a: first ridge, 11b: second ridge, 11c: third ridge, 12: head tip surface, 12a, 12b: flank, 13: head outer peripheral surface, 14: first flute, 14a: first end, 14b: second end, 15: second flute, 15a: first end, 15b: second end, 16, 17: cutting edge, 18: shank shaft, 18a: notch, 18b: inclined surface, 20: holder, 21: second attachment surface, 21a: first groove, 21b: second groove, 21c: third groove, 21d: first hole, 22: holder outer peripheral surface, 23: flute, 23a: first end, 23b: second end, 24: flute, 24a: first end, 24b: second end, 25: second hole, 30: fixing member, A, A1, A2: central axis, D: outer diameter, DR: direction, T23, T24: thickness, VL1, VL2, VL3, VL4, VL5, VL6, VL7, VL8, VL9, VL10, VL11, VL12, VL13, VL14: virtual straight line, θ1, θ2, θ3, θ4, θ5, θ6, θ7, θ8, θ9, θ10, θ11, θ12, θ13, θ14: angle

The invention claimed is:

1. A drill head that is rotated about a central axis, the drill head comprising:
a first attachment surface attached to a holder; a head tip surface opposite to the first attachment surface in an axial direction along the central axis; and a head outer peripheral surface continuous with the first attachment surface and the head tip surface,
wherein
the head outer peripheral surface is provided with a first flute and a second flute that extend helically about the central axis from the head tip surface to reach the first attachment surface,
the first flute and the second flute are symmetric with respect to the central axis,
when the first attachment surface is viewed along the central axis and in a direction from the first attachment surface toward the head tip surface, each of the first flute and the second flute has a first end and a second end on the first attachment surface, the first end and the second end facing each other with a space between them in a circumferential direction along a circumference centered on the central axis,
the first attachment surface is provided with ridges that are radially asymmetrical with respect to the central axis, the ridges including a first ridge, a second ridge, and a third ridge that extend along a radial direction orthogonal to the axial direction,
the first ridge is located between the first end of the first flute and the second end of the second flute in the circumferential direction,
the second ridge and the third ridge are located between the second end of the first flute and the first end of the second flute in the circumferential direction,
the second ridge is closer to the second end of the first flute than the third ridge in the circumferential direction,
an angle formed by a virtual straight line passing through a center of the first ridge in the radial direction and a virtual straight line passing through the central axis and the first end of the first flute is equal to an angle formed by the virtual straight line passing through the center of the first ridge in the radial direction and a virtual straight line passing through the central axis and the second end of the second flute.

2. The drill head according to claim 1, wherein the angle formed by the virtual straight line passing through the center of the first ridge in the radial direction and the virtual straight line passing through the central axis and the first end of the first flute is 30° or more and 70° or less.

3. The drill head according to claim 1, wherein
an angle formed by the virtual straight line passing through the center of the first ridge in the radial direction and a virtual straight line passing through a center of the second ridge in the radial direction is 150° or more and 170° or less, and an angle formed by the virtual straight line passing through the center of the first ridge in the radial direction and a virtual straight line passing through a center of the third ridge in the radial direction is 150° or more and 170° or less.

4. The drill head according to claim 3, wherein an angle formed by the virtual straight line passing through the center of the second ridge in the radial direction and the virtual straight line passing through the center of the third ridge in the radial direction is 20° or more and 60° or less.

5. The drill head according to claim 4, wherein when the first attachment surface is viewed along the central axis and in the direction from the first attachment surface toward the head tip surface, the first flute is twisted so as for an intersection line between the first flute and the head outer peripheral surface to extend clockwise from the second end of the first flute along the circumferential direction, and an angle formed by the virtual straight line passing through the center of the second ridge in the radial direction and a virtual straight line passing through the central axis and the second end of the first flute is larger than an angle formed by the virtual straight line passing through the center of the third ridge in the radial direction and a virtual straight line passing through the central axis and the first end of the second flute.

6. The drill head according to claim 5, wherein the first ridge has a width that is 1.1 times or more and 2.0 times or less a width of the second ridge and a width of the third ridge.

7. A drill comprising:
a holder; and
the drill head according to claim 1,
wherein
the holder has a second attachment surface in contact with the first attachment surface,
the second attachment surface is provided with a first groove, a second groove, and a third groove that extend along the radial direction, and
the first groove, the second groove, and the third groove are fitted to the first ridge, the second ridge, and the third ridge, respectively.

8. A drill comprising:
a drill head;
a holder; and
a fixing member,
wherein
the drill head includes a first attachment surface attached to the holder, a head tip surface opposite to the first attachment surface in an axial direction along a central axis of the drill head, a head outer peripheral surface continuous with the first attachment surface and the head tip surface, and a shank shaft extending from the first attachment surface along the axial direction,
the head outer peripheral surface is provided with a first flute and a second flute that extend helically about the central axis from the head tip surface to reach the first attachment surface,
the first flute and the second flute are symmetric with respect to the central axis, when the first attachment surface is viewed along the central axis and in a direction from the first attachment surface toward the head tip surface, each of the first flute and the second flute has a first end and a second end on the first attachment surface, the first end and the second end facing each other with a space between them in a circumferential direction along a circumference centered on the central axis, the first attachment surface is provided with ridges that are radially asymmetrical with respect to the central axis, the ridges including a first ridge, a second ridge, and a third ridge that extend along a radial direction orthogonal to the axial direction, the first ridge is located between the first end of the first flute and the second end of the second flute in the circumferential direction, the second ridge and the third ridge are located between the second end of the first flute and the first end of the second flute in the circumferential direction, the second ridge is located closer to the second end of the first flute than the third ridge in the circumferential direction, an angle formed by a virtual straight line passing through a center of the first ridge in the radial direction and a virtual straight line passing through the central axis and the first end of the first flute is equal to an angle formed by the virtual straight line passing through the center of the first ridge in the radial direction and a virtual straight line passing through the central axis and the second end of the second flute, the shank shaft is provided with a notch, the holder has a second attachment surface in contact with the first attachment surface, and a holder outer peripheral surface continuous with the second attachment surface, the second attachment surface is provided with a first hole into which the shank shaft is inserted, and a first groove, a second groove, and a third groove that extend along the radial direction, the first groove, the second groove, and the third groove are fitted to the first ridge, the second ridge, and the third ridge, respectively, the holder outer peripheral surface is provided with a second hole continuous with the first hole, and fixing member is in contact with the notch by being inserted into the second hole.

9. The drill head according to claim 1, wherein the first attachment surface includes only three ridges extending along the radial direction.

10. The drill according to claim 7, wherein the first attachment surface includes only three ridges extending along the radial direction.

11. The drill according to claim 8, wherein the first attachment surface includes only three ridges extending along the radial direction.

* * * * *